Patented Dec. 16, 1952

2,622,104

UNITED STATES PATENT OFFICE 2,622,104

UNSATURATED CARBINOL AND PROCESS OF PREPARING SAME

Ronald Major Evans, Ickenham, England, assignor to Glaxo Laboratories Limited, Greenford, England, a British company No Drawing. Application July 31, 1950, Serial No. 176,913. In Great Britain August 18, 1949

10 Claims. (Cl. 260—631)

1

This invention is concerned with the preparation of a new unsaturated carbinol, namely, 3:7-dimethyl-1-(1'-hydroxy-2':6':6'-trimethylcyclohexyl)nona-4:6:8-trien-1-yn-3-ol, which may be represented by the following structural formula

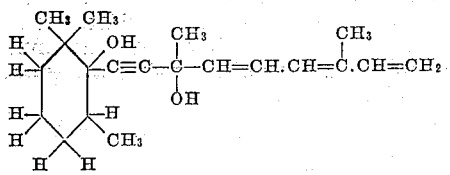

and which is useful in the synthesis of vitamin A and related substances.

It has been found that the new carbinol can conveniently be prepared by reacting a halogeno magnesium derivative of 2:6:6-trimethyl-1-ethynylcyclohexan-1-ol with 6-methylocta-3:5:7-trien-2-one in the presence of an inert solvent and subsequenttly decomposing the resulting complex formed; although it is not desired to limit the invention by any theoretical considerations it is believed that this reaction may be represented as follows:

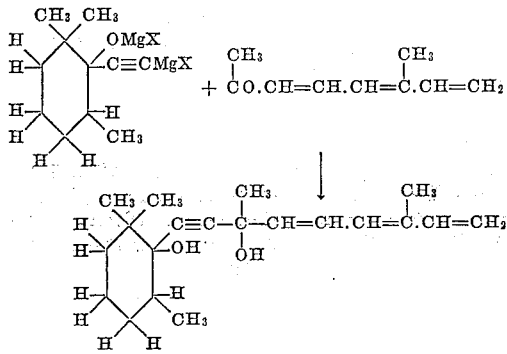

where X is chlorine, bromine or iodine.

Accordingly the invention comprises the new compound 3:7-dimethyl-1-(1'-hydroxy-2':6':6'-trimethylcyclohexyl) nona-4:6:8-trien-1-yn-3-ol.

According to a further feature of the invention there is provided a process for the preparation of a new unsaturated carbinol, namely, 3:7-dimethyl - 1-(1'-hydroxy - 2'6:6' - trimethylcyclohexyl)-nona-4:6:8-trien-1-yn-3-ol in which a halogeno magnesium derivative of the general formula:

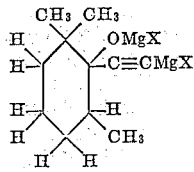

(where X is chlorine, bromine or iodine) is reacted with 6-methylocta-3:5:7-trien-2-one in

2 the presence of an inert solvent as herein defined and the resulting organo magnesium complex decomposed to yield the desired carbinol.

The term "inert solvent" as used herein means an organic solvent which has no demonstratable action on the reactants or the products of the reaction, other than the normal action of solvents in Grignard reactions. It is preferable to use aliphatic ethers and cyclic aliphatic ethers having from 4–10 carbon atoms, for example, diethyl ether, di-iso-amyl ether, dioxan and tetrahydrofuran; other inert solvents such as benzene or anisole may be used alone or in conjunction with these solvents. It is also preferable that the solvent used should be as dry as possible.

The first stage of the process, namely, the reaction of the halogeno magnesium derivative with the ketone, is preferably carried out at a temperature wthin the range of from −20 to +60° C. for several hours, preferably in an inert atmosphere, for example in an atmosphere of nitrogen. It is also generally desirable to have present a small quantity of an anti-oxidant, e. g. hydroquinone.

The second stage of the process, namely, the decomposition of the organo-magnesium complex may be carried out by conventional methods, for example by the use of water which may contain other reagents. The use of strongly acidic reagents in the de-composition should preferably be avoided. It is preferable to use an aqueous solution of ammonium chloride for the decomposition which may, for example be effected at or slightly below room temperature.

The halogeno magnesium derivative of 2:6:6-trimethyl-1-ethynylcyclohexan-1-ol may be prepared by conventional methods; we prefer, according to a further feature of the invention to prepare this derivative by reacting 2:6:6-trimethyl-1-ethynylcyclohexan-1-ol with approximately 2 mols of an alkyl Grignard reagent, for example ethyl magnesium bromide, preferably at a temperature within the range of from 0–60° C. This reaction is also preferably effected in an inert atmosphere and in the same solvent as is used for the first stage of the process according to the invention.

The new carbinol in the purest form it has been possible to prepare shows the following characteristics after distillation at $10^{-5}$ mm. pressure:

Refractive index, $(n_D^{15.5°})$ 1.5483

Light absorption, max. 2810 and 2700 Å.

$E_{1\,cm.}^{1\%}$ 954 and 1310 respectively.

$\epsilon$ 29,000 and 40,000 respectively.

It will be readily understood that these characteristics are liable to variation according to the purity of any particular sample of the new carbinol.

2:6:6 - trimethyl - 1 - ethynylcyclohexan-1-ol may for example be prepared by the method described in Example 3 of British Patent No. 627,453.

6-methylocta-3:5:7-trien-2-one may be prepared by any convenient method for example by the process described in co-pending application serial No. 148,264, filed March 17, 1950, now abandoned; a further method of preparing this compound is described in co-pending application Serial No. 148,261, also filed March 7, 1950, now Patent No. 2,606,930.

In order that the invention may be well understood the following examples are given only as illustrations:

Example 1

2:6:6 - trimethyl - 1 - ethynylcyclohexan-1-ol (10.6 g.) was added dropwise in an atmosphere of nitrogen to a cooled solution (0–5°) of ethylmagnesium bromide (prepared from 3.7 g. of magnesium in 150 cc. of dry ether) containing a trace of hydroquinone over a period of 30 minutes. After refluxing for 30 minutes the Grignard complex separated out as an oil and was maintained in a fine degree of dispersion by rapid stirring. 6-methylocta-3:5:7-trien-2-one (8.0 g.) in dry ether (50 cc.) was added gradually to the stirred Grignard reagent at 0° over a period of 1½ hours. After stirring for a further period of 2 hours, during which time the temperature of the reactants was allowed to rise to room temperature, the complex was decomposed by the addition of cold saturated ammonium chloride solution (100 cc.), the product was extracted with ether, the ethereal extract washed with saturated sodium bicarbonate solution, and dried over anhydrous potassium carbonate. Removal of the solvent, and purification of the product first by heating at 50° in a high vacuum and then by chromatographing in a column of deactivated alumina, using a mixture of benzene and petroleum ether (B. P. 40–60°) as solvent, gave 3:7-dimethyl-1-(1'hydroxy 2':6':6'-trimethylcyclohexyl) nona-4:6:8-trien-1-yn-3-ol (3.0 g.) as a viscous yellow gum. $n_D^{15°}$ 1.5455.

Light absorption, maxima, 2,690 and 2,810 Å.
$E_{1\,cm.}^{1\%}$ = 1093 and 879 respectively.
ε 33,000 and 27,000 respectively.

Example 2

2:6:6 - trimethylethynylcyclohexan-1-ol (9 g.) in tetrahydrofuran (15 ml.) was added to a Grignard reagent prepared from magnesium (3 g.) and ethyl bromide (15 g.) in tetrahydrofuran (40 ml.) and the mixture refluxed with stirring for 2 hours in nitrogen. It was cooled to room temperature and 6-methyl-octa-3:5:7-trien-2-one (7.4 g.) in tetrahydrofuran (10 ml.) was added. The mixture was allowed to stand overnight and worked up as in Example 1, giving a yellow oil (16.35 g.) $n_D^{15}$ 1.5406.

Light absorption, maxima, 2700 and 2810 Å.
$E_{1\,cm.}^{1\%}$ 364 and 307 respectively.
ε 11,000 and 9,000 respectively.

Example 3

2:6:6 - trimethylethynylcyclohexan-1-ol (6.75 g.) in di-isoamyl ether (25 ml.) was added at room temperature to the Grignard reagent prepared from magnesium (2.32 g.) and methyl iodide (16.3 g.) in di-isoamyl ether (50 ml.). The product was heated to 50° for 1 hour. It was cooled to −15° and 6-methyl-octa-3:5:7-trien-2-one (5 g.) in diisoamyl ether (30 ml.) added. The mixture was then stirred at room temperature for 1 hour. It was worked up as in Example 1, and gave a pale brown liquid $n_D^{15}$ 1.5360.

Light absorption, maxima, 2700 and 2810 Å.
$E_{1\,cm.}^{1\%}$ 653 and 707, respectively.
ε 20,000 and 21,000 respectively.

Example 4

A Grignard reagent was prepared by passing ethyl chloride into a stirred suspension of magnesium (1.87 g.) in diethyl ether (34 ml.) until the magnesium had dissolved. To the refluxing Grignard reagent was added 2:6:6-trimethylethynylcyclohexan-1-ol (5.4 g.) in dry dioxan (30 ml.). The mixture was stirred and refluxed for 2 hours and then 6-methyl-octa 3:5:7-trien-2-one (4 g.) in dioxan (30 ml.) added. Refluxing was continued for 1 hour and the mixture worked up as in example 1 giving a somewhat mobile liquid. $n_D^{16}$ 1.5162.

Light absorption, maxima, 2690 and 2800 Å.
$E_{1\,cm.}^{1\%}$ 270 and 230 respectively.
ε 8,000 and 7,000 respectively.

The crude reaction products obtained by these methods may be purified by known methods of distillation and/or chromatography to obtain material having the physical constants quoted above for the material in the purest form it has been possible to obtain.

I claim:

1. As a new compound, 3:7-dimethyl-1-(1'-hydroxy 2':6':6' - trimethylcyclohexyl) nona-4:6:8-trien-1-yn-3-ol represented by the following structural formula

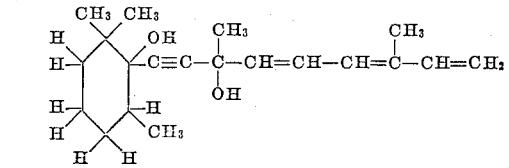

2. A process for the preparation of 3:7-dimethyl - 1 -(1'-hydroxy-2':6':6'-trimethylcyclohexyl)-nona-4:6:8-trien-1-yn-3-ol which comprises first reacting a halogeno magnesium derivative of the general formula:

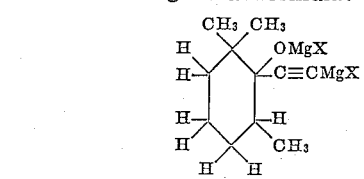

where X is selected from the group consisting of chlorine, bromine and iodine with 6-methylocta-3:5:7-trien-2-one in the presence of an inert solvent selected from the group consisting of aliphatic and cyclic aliphatic ethers having from 4 to 10 carbon atoms at a temperature within the range of from −20° to +60° C. and then decomposing the resulting organo magnesium complex with water to yield the desired carbinol.

3. A process as claimed in claim 2 in which the inert solvent is diethyl ether.

4. A process as claimed in claim 2 in which the inert solvent is di-isoamyl ether.

5. A process as claimed in claim 2 in which the inert solvent is dioxan.

6. A process as claimed in claim 2 in which the inert solvent is tetrahydrofuran.

7. A process as claimed in claim 2 in which the reaction is carried out in an inert atmosphere and in the presence of an anti-oxidant.

8. A process for the preparation of 3:7-dimethyl - 1 -(1'-hydroxy-2':6':6'-trimethylcyclohexyl)-nona-4:6:8-trien-1-yn-3-ol which comprises first reacting 2:6:6-trimethyl-1-ethynylcyclohexan-1-ol with approximately 2 mols of an alkyl Grignard reagent in an inert solvent selected from the group consisting of aliphatic and cyclic aliphatic ethers having 4 to 10 carbon atoms, then reacting the product with 6-methyl-octa-3:5:7-trien-2-one in the presence of said inert organic solvent and at a temperature within the range of from —20° to +60° C. and finally decomposing the resulting organo magnesium complex with aqueous ammonium chloride.

9. A process as described in claim 8 in which the said alkyl Grignard reagent is ethyl magnesium bromide.

10. A process as claimed in claim 8 in which the reaction of 2:6:6-trimethyl-1-ethynylcyclohexan-1-ol with the alkyl Grignard reagent is carried out at a temperature of from 0 to 60° C. in an inert atmosphere.

RONALD MAJOR EVANS.

REFERENCES CITED

The following references are of record in the file of this patent:

UNITED STATES PATENTS

| Number | Name | Date |
|---|---|---|
| 2,475,139 | Isler et al. | July 5, 1949 |
| 2,531,567 | Heilbron et al. | Nov. 28, 1950 |
| 2,579,658 | Evans | Dec. 25, 1951 |
| 2,591,811 | Heilbron et al. | Apr. 8, 1952 |

FOREIGN PATENTS

| Number | Country | Date |
|---|---|---|
| 627,453 | Great Britain | Aug. 9, 1949 |

OTHER REFERENCES

Milas et al.: Jour. Amer. Chem. Soc., vol. 70, pp. 1829–34 (May 1948) (6 pp.).

Heilbron et al.: Jour. Chem. Soc. (England), August 1949, pp. 2023–27.